US011893377B2

(12) United States Patent
Reed et al.

(10) Patent No.: US 11,893,377 B2
(45) Date of Patent: Feb. 6, 2024

(54) DEPENDENCY-AWARE RULES ENGINE FOR DELIVERING MANAGED PACKAGE UPGRADES

(71) Applicant: Salesforce, Inc., San Francisco, CA (US)

(72) Inventors: David Reed, San Francisco, CA (US); Jason Lantz, San Francisco, CA (US); Marcel Pufal, San Francisco, CA (US); James Estevez, San Francisco, CA (US); Beth Breisnes, San Francisco, CA (US); Brandon Parker, San Francisco, CA (US); David Ray, San Francisco, CA (US)

(73) Assignee: Salesforce, Inc.

( * ) Notice: Subject to any disclaimer, the term of this patent is extended or adjusted under 35 U.S.C. 154(b) by 8 days.

(21) Appl. No.: 17/730,816

(22) Filed: Apr. 27, 2022

(65) Prior Publication Data

US 2023/0350661 A1  Nov. 2, 2023

(51) Int. Cl.
G06F 8/60 (2018.01)
G06F 8/65 (2018.01)

(52) U.S. Cl.
CPC ................................ *G06F 8/65* (2013.01)

(58) Field of Classification Search
CPC ......................................................... G06F 8/60
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

"Google Plus Users", Google+Ripples; Oct. 31, 2011; 3 pages.

*Primary Examiner* — Jae U Jeon
(74) *Attorney, Agent, or Firm* — Lorenz & Kopf, LLP

(57) ABSTRACT

A method implemented by at least one server for pushing managed package upgrades comprises receiving a dependency graph from an operating entity via an API call that expresses relationships between a set of software packages. A subscriber set is ingested for subscribers of the software packages via an API call to the operating entity that owns the software packages. A per-subscriber dependency graph is constructed expressing relationships between the individual subscriber's delivery operations. The set of packages is delivered based on dependency order of the per-subscriber dependency graph, while applying one or more rules including: i) push schedule rules that allow the first operating entity to specify time-based gates for the deliveries; ii) subscriber exclusion rules that allow the operating entity to exclude specific subscribers; iii) rules for automatic retries of failed operations; and iv) rules to chunk the push upgrade operations.

23 Claims, 5 Drawing Sheets

(56) References Cited

U.S. PATENT DOCUMENTS

| | | |
|---|---|---|
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 11,372,635 B2 | 6/2022 | Padmanabhan et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |

(56) References Cited

U.S. PATENT DOCUMENTS

| | | | |
|---|---|---|---|
| 2008/0077995 A1* | 3/2008 | Curnyn | H04L 63/1441 |
| | | | 726/27 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2011/0218958 A1 | 9/2011 | Warshavsky | |
| 2011/0247051 A1 | 10/2011 | Bulumulla | |
| 2012/0042218 A1 | 2/2012 | Cinarkaya | |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0317280 A1* | 10/2014 | Ke | H04L 12/1432 |
| | | | 709/224 |
| 2014/0359537 A1 | 12/2014 | Jackobson et al. | |
| 2018/0260301 A1* | 9/2018 | Podjarny | G06F 16/2379 |
| 2020/0195500 A1* | 6/2020 | Kishen | G06F 9/45558 |
| 2021/0149908 A1 | 5/2021 | Markham et al. | |
| 2021/0150448 A1 | 5/2021 | Gray et al. | |
| 2022/0309450 A1* | 9/2022 | Mishra | G06N 20/00 |

\* cited by examiner

DEPENDENCY-AWARE RULES ENGINE FOR DELIVERING MANAGED PACKAGE UPGRADES

TECHNICAL FIELD

One or more implementations relate to the field of push upgrades for managed software packages; and more specifically, to a dependency-aware rules engine for delivering managed package upgrades.

BACKGROUND ART

In the context of cloud platforms, such as a SAAS platform, managed software packages provide functionality to users or tenants of the platform. A managed software package is an assemblage of files and information about those files. Each user/tenant is also a subscriber in that they can subscribe to one or more of the managed software packages. Subscribed to packages are installed in the tenant's instance, including future upgrades to the packages. A package manager is a program used to install, uninstall and manage software packages. The package manager may upgrade a managed package installed in a tenant's instance from version X to version Y, and a push upgrade is an upgrade made to the tenant's managed package without explicit consent.

Managing push upgrades in a cloud platform is a challenge for conventional package managers and push upgrade systems. In particular, a conventional push upgrade system is not aware of dependencies that may exist among hierarchies of packages to be upgraded; does not perform retries; has no sophisticated scheduling capabilities, and has a highly non-ergonomic UI and API interface.

These challenges impact common upgrade workflows and objectives. Because conventional push upgrade systems are not dependency-aware, teams shipping packages with hierarchies must manually sequence push upgrades across a dependency hierarchy, typically at the package level, rather than at the subscriber level. This process is extremely inefficient and error-prone. Similarly, users of the push upgrade system must interpret any returned error messages and make decisions about retries of failed deliveries, with no systematic support.

What is needed, therefore, is an improved push upgrade system for delivering managed package upgrades.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for a dependency-aware rules engine. The disclosed implementations provide an improved push upgrade system that utilizes the dependency-aware rules engine to create per-subscriber dependency graphs from an input package dependency graph and execute delivery of pushed upgrades to the subscribers based on the dependency order of the per-subscriber dependency graphs and a set of upgrade rules. The rule-based based system has package dependency-awareness, and is capable of utilizing scheduling and exclusion rules and rules for grouping subscribers within specific infrastructure units and to desired chunk sizes.

Figure 1:
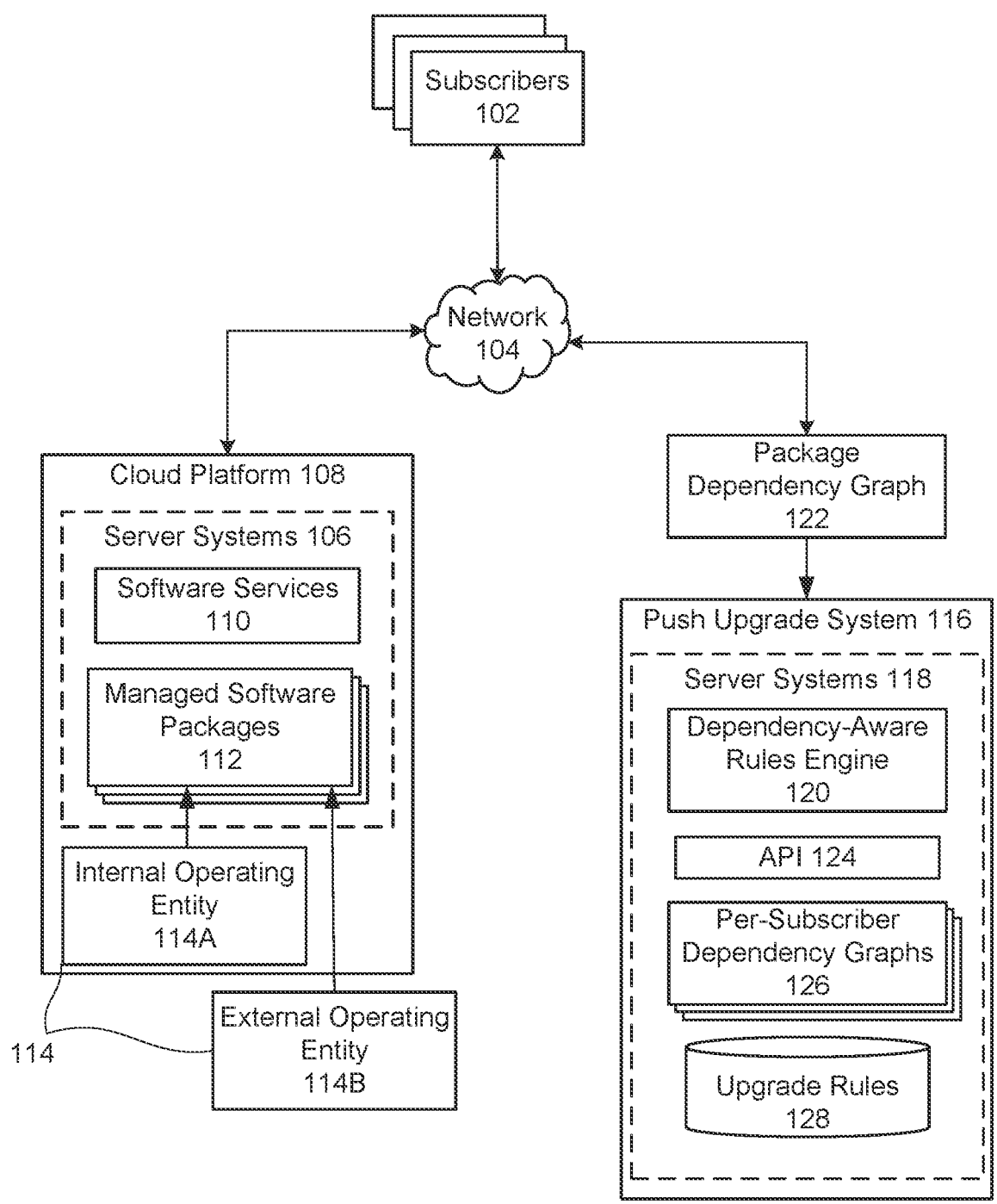
FIG. 1 illustrates a system for delivering managed package upgrades using a dependency-aware rules engine.

FIG. 1 illustrates a system for delivering managed package upgrades using a dependency-aware rules engine. The system 100 includes a set of subscribers 102 that are hosted by one or more servers 106 of a cloud platform 108. The subscribers 102 may access software services 110 provided by the cloud platform 108 using client devices (not shown) that are in communication over a network 104 (e.g., the Internet) with the servers 106. The functionality of the software services 110 is provided by managed software packages 112 when they are executed by the servers 106. The managed software packages 112 (also referred to as "managed packages" or simply "packages") comprise an assemblage of files and information about those files that may be organized as a tree-like hierarchy of packages that depend on one another. Each of the subscribers 102 may subscribe to one or more of the managed software packages 112. Subscribed to packages and future upgrades of those packages may be installed in the subscriber's instance within the cloud platform 104. Operating entities 114 build the managed software packages 112 that provide functionality of the software services 110. The operating entities 114 (also referred to operators 114) may include an internal operating entity 114A of the cloud platform 108, e.g., an internal application developer, and/or an external operating entity 114B, e.g. a third-party application developer.

In implementations, the cloud platform 108 may comprise a software-as-a-service (SAAS), a platform-as-a-service (PAAS), or an infrastructure-as-a-service (IAAS). In one implementation, the subscribers 102 are customers of the cloud platform 108 and may represent individual users or organizations. In one implementation, the cloud platform 108 may be implemented as a single-tenant or a multi-tenant cloud architecture. A single-tenant cloud architecture is one where a single software instance and its supporting infrastructure/database serve only one customer, and all customer data and interactions are separate from every other customer. A multitenant architecture allows the customers to share computing resources where each customer (also called tenants) has an independent instance operating in a shared environment.

The hierarchical structure of the managed software packages 112 creates dependencies among the packages that defines how the managed software packages 112 should be installed and upgraded. The managed package dependencies are directional, meaning for example, if subscriber 1 has an upgraded version of managed package A installed, then the upgraded version of managed package B may be installed, but if the upgraded version of managed package A is not installed, then the upgraded version of managed package B cannot be installed. Dependencies can extend to any arbitrary depth of complexity, i.e., managed package A, package B, package C, . . . Package N. Managed software packages 112 are one to many, so package A can have child packages B, C, and D, all of which require installation of package A, but installation of package A does not require the installation of any of the child packages.

Upgrades to the managed packages 112 can be delivered by the operating entity 114 through a facility called a push upgrade, that allows the managed package owner/operator to automatically deliver a new version of the managed package 112 to the subscribers 102. This process is transparent to the subscribers 102.

However, conventional push upgrade systems are not aware of managed package dependencies. Continuing with the example above, assume that a push upgrade is attempted for package B prior to the upgrade for package A. This push upgrade operation will eventually fail because the corresponding version of package A is not yet installed. The conventional push upgrade system is also not enabled to perform other operations, such as sophisticated subscriber exclusions. For example, the conventional push upgrade systems lack the ability to designate that any subscriber who does not have a package above a particular version, e.g. 1.2, will not receive a current upgrade, e.g., 1.3. Conventional push upgrade systems are not resilient to transitory network or installation failures that may be cured by a retry mechanism. These friction points limit the ability of package owners such as the operating entity 114 to use a push upgrade system at scale where there are many package dependencies involved, which is a complex problem.

The disclosed implementation mitigates such problems with an improved push upgrade system 116. The improved push upgrade system 116 includes a server system 118 or a cluster of one or more servers that execute a dependency-aware rules engine 120 for automatically managing and deploying managed software packages 112 and their upgrades at scale to one or more cloud platforms 108. The dependency-aware rules engine 120 accomplishes this function by allowing operating entities 114 that develop and own the managed software packages 112 to input a package dependency graph 122 via an application programming interface (API) 124. In general, a dependency graph is a directed graph that describes the dependency of an objects on other objects in a given system. Here, the package dependency graph 122 is used to define hierarchical dependency relationships between a specified set of managed software packages 112 that the operating entity 114 wishes to deliver to subscribers 102 who subscribe to the specified set. The dependency-aware rules engine 120 and the API 124 also allow the operating entities 114 to enter a number of upgrade rules 128, such as subscriber exclusion rules that prevent delivery to certain subscribers based on criteria, and schedule rules that define the times after which the push upgrade system 116 can be can deliver the upgrades to a specific sets of subscribers 102.

The dependency-aware rules engine 120 receives input information, i.e., the package dependency graph 122 and the set of upgrade rules 128 specified by the operating entity 114, and ingests the available subscribers 102 that have all of the specified managed software packages 112 installed. The dependency-aware rules engine 120 then constructs per-subscriber dependency graphs 126 that represents all the operations that are needed at a low level, e.g., deliver one package to one specified subscriber 102, that is needed to bring the entire subscriber set to a desired state. For example, assume subscriber 1 has packages A and B installed and that the package dependency graph 122 includes both packages A and B.

The dependency-aware rules engine 120 sends a request to the operating entity 114 responsible for packages A and B to identify the subscribers, e.g., subscriber 1, and then constructs a subscriber dependency graph of the operations required for subscriber 1 (and any other subscribers). The per-subscriber dependency graph 126 represents the operations involved, e.g., deliver package A to subscriber 1 then deliver package B to subscriber 1, and represents the dependency between those low-level operations. For example, the delivery of package B to subscriber 1 is dependent upon first delivering package A to subscriber 1.

After generating the per-subscriber dependency graphs 126, the dependency-aware rules engine 120 delivers the set of managed packages based on dependency order defined in the per-subscriber dependency graphs. In one implementation, the dependency-aware rules engine 120 may send a request to the operating entities 114 responsible for the packages to deliver the packages. In another embodiment, the dependency-aware rules engine 120 may perform the delivery of the packages.

In one implementation, the push upgrade system 116 may be independent and remote from the cloud platform 108. In other implementations, the push upgrade system 116 may be implemented as part of the cloud platform 108.

Figure 2A:
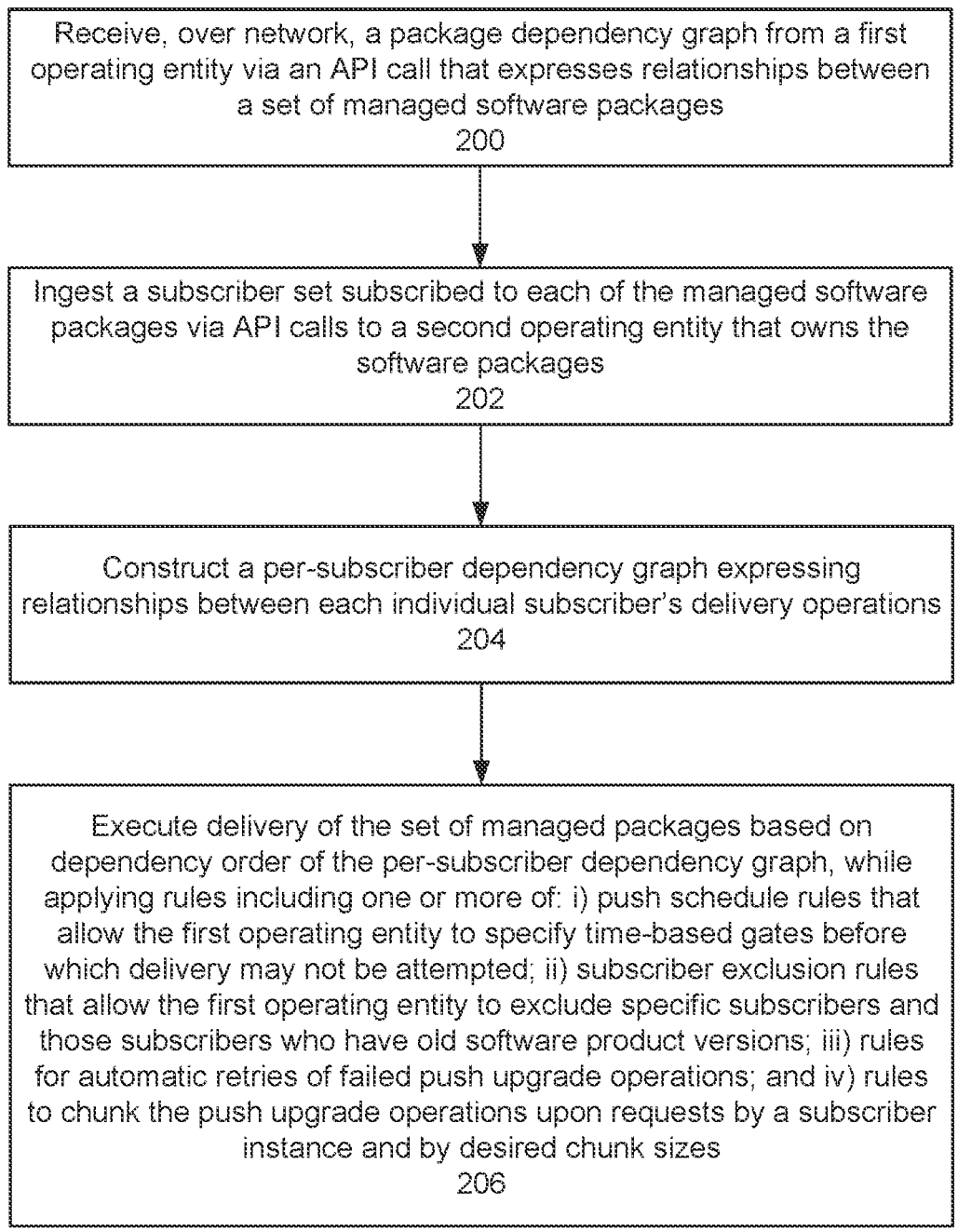
FIG. 2A is a flow diagram illustrating a process performed by the dependency-aware rules engine for pushing managed package upgrades according to the disclosed implementations.

FIG. 2A is a flow diagram illustrating a process performed by the dependency-aware rules engine 120 for pushing managed package upgrades according to the disclosed implementations. Referring to both FIGS. 1 and 2, the process may begin by receiving, over network 104, a package dependency graph 122 from a first operating entity 114 via a first API call, the package dependency graph expressing relationships between a set of managed software packages 112 (block 200). In one implementation, the dependency-aware rules engine 120 can determine a hierarchical dependency order of delivery operations between the set of managed software packages from the package dependency graph 122.

Figure 2C:
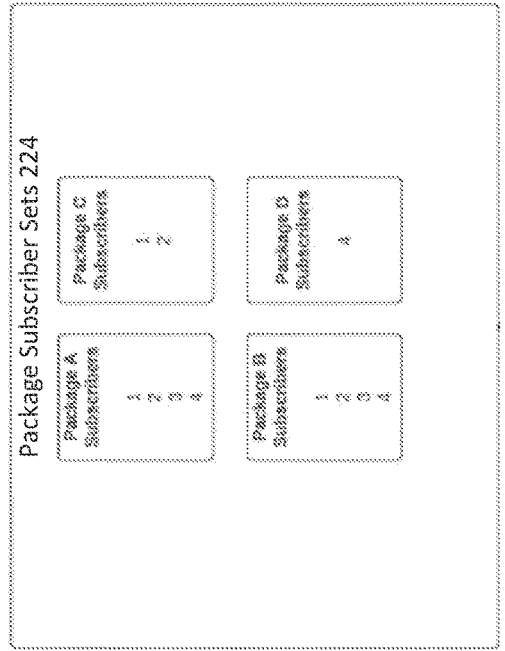
FIG. 2C illustrates example subscriber sets for the managed software packages shown in FIG. 2B.
Figure 2B:
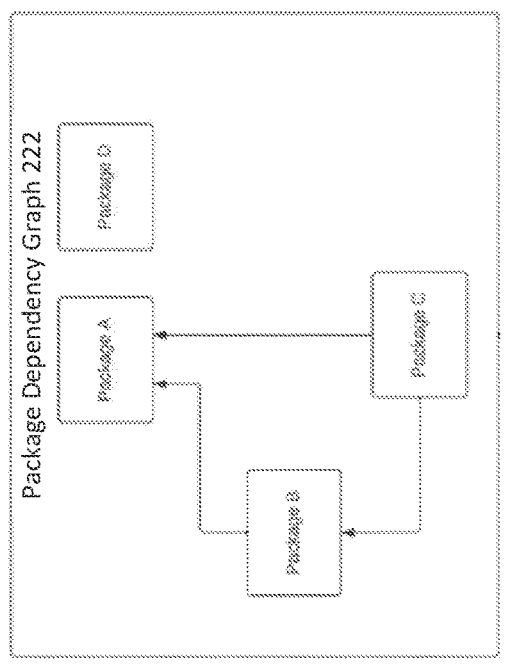
FIG. 2B illustrates an example package dependency graph defining the dependency relationships of a set of managed software packages A, B, C, and D, as shown by the arrows.

FIG. 2B illustrates an example package dependency graph 222 defining the dependency relationships of a set of managed software packages A, B, C, and D, as shown by the arrows. Installation of packages B and C are dependent on the installation of package A, and the installation of package C is also dependent on the installation of package B.

Referring again to FIG. 2A, the dependency-aware rules engine 120 ingests a subscriber set subscribed to each of the managed software packages in the set via a second API call to a second operating entity that owns the software packages (block 202). As used herein, a subscriber set is a list of the subscribers 102 that subscribe to one more of the packages in the set of managed software packages 112. In one implementation, the first operating entity 114 that provides a package dependency graph 122 may be the same or different than the second operating entity that provides a subscriber set. In one implementation, the dependency-aware rules engine 120 may send a request to the operating entity 114 for a package subscriber set for each managed software packages 112.

FIG. 2C illustrates example subscriber sets 224 for the managed software packages 112 shown in FIG. 2B. In this example, subscribers 1 through 4 subscribe to both packages A and B, subscribers 1 and 2 subscribe to package C, and subscriber 4 subscribes to package D. Once the dependency-aware rules engine 120 receives the package subscriber sets 224, the dependency-aware rules engine 120 may store the information in a database.

Referring again to FIG. 2A, responsive to receiving the package dependency graph 122, the dependency-aware rules engine 120 constructs per-subscriber dependency graph expressing relationships between the individual subscriber's delivery operations (block 204). In one implementation, the dependency graph defines a hierarchical dependency order of the delivery operations for the packages, and is stored in a database. For example, assume subscriber 1 has packages A and B installed and that the dependency graph includes both packages A and B. The dependency-aware rules engine 120 first determines the identities of the subscribers, i.e., subscriber 1 who subscribe to packages A and B. This may be done by sending a request to the operating entities 114 responsible for packages A and B for subscriber IDs. The dependency-aware rules engine 120 then constructs the per-subscriber dependency graph of the delivery operations required for each subscriber (subscriber 1) that represents the hierarchical dependency order between those low-level delivery operations.

Figure 2D:
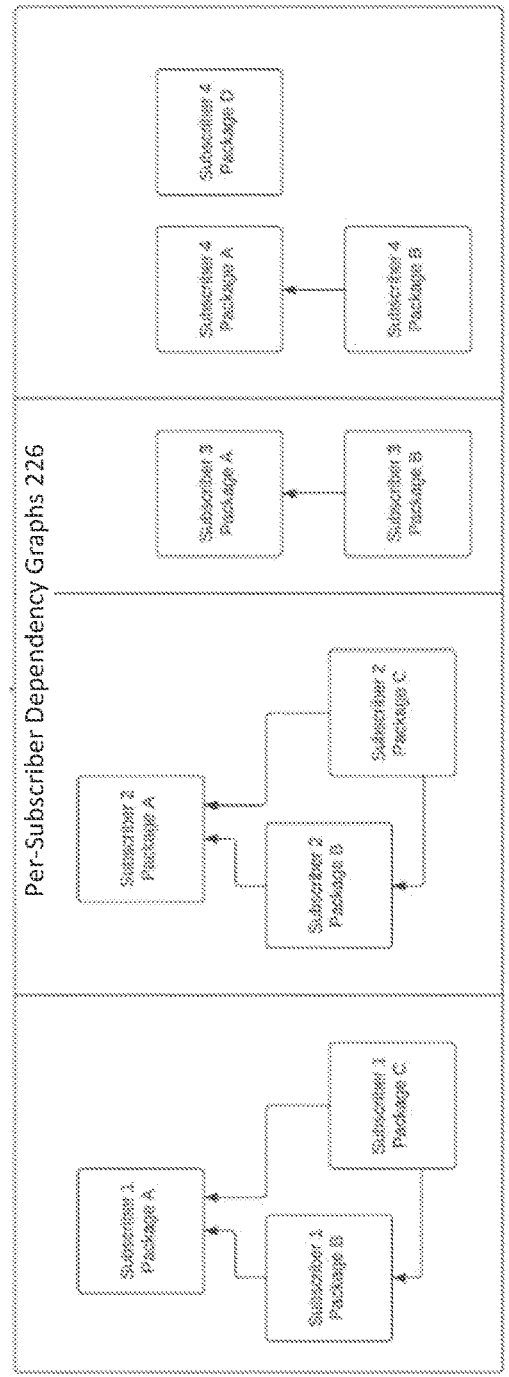
FIG. 2D illustrates example per-subscriber dependency graphs 226 for subscribers 1 through 4 from the example of FIGS. 2B and 2C.

FIG. 2D illustrates example per-subscriber dependency graphs 226 for subscribers 1 through 4 from the example of FIGS. 2B and 2C. The dependency graph for subscriber 1 shows that delivery of package B to subscriber 1 is dependent upon delivering package A to subscriber 1, so package A will delivered first to subscriber 1 and followed by delivery of packages B and then C to subscriber 1. The per-subscriber dependency graphs can be elaborated out to an arbitrary depth in terms of both packages and subscribers. An example range for the number of subscribers is 100,000 to 150,000 in total, and the total number of managed software packages can be arbitrary.

Referring again to FIG. 2A, the dependency-aware rules engine 120 executes delivery of the set of managed packages based on dependency order of the per-subscriber dependency graph (block 206). As used herein, executing delivery refers to the process of installing the set of managed packages in the instances of the individual subscribers in the cloud platform 108, while at the same time applying upgrade rules 128. Upgrade rules 128 may include one or more of: i) push schedule rules that allow the first operating entity to specify time-based gates before which delivery may not be attempted; ii) subscriber exclusion rules that allow the first operating entity to exclude specific subscribers and those subscribers who have old software product versions; iii) rules for automatic retries of failed push upgrade operations; and iv) rules to chunk the push upgrade operations upon requests by a subscriber instance and by desired chunk sizes. Chunking push upgrade may refer to batching of the push upgrade operations.

In some implementations, the upgrade rules 128 may be specified by the operating entity 114 and received by the dependency-aware rules engine 120 in the initial API call when the package dependency graph 122 is received. In another implementation, the upgrade rules 128 may be received after the package dependency graph 122 is received via another API call. In addition, the package dependency graph 122, the per-subscriber dependency graphs 126, and the upgrade rules 128 may be stored in one or more databases of the push upgrade system 116.

In one embodiment, actual delivery of the set of managed packages may be implemented by the dependency-aware rules engine 120 sending requests (e.g., API calls) to the operating entities 114 to deliver the managed software packages 112 to the set of eligible subscribers. During the process of delivering of the set of managed packages, the dependency-aware rules engine 120 works its way through the per-subscriber dependency graphs 126, delivering upgrades in dependency order to each subscriber therein and advances each subscriber down the corresponding individual dependency graph as packages are successfully installed. In the previous example, the dependency-aware rules engine 120 would first attempt to deliver package A to subscriber 1 and only after that delivery succeeds would the dependency-aware rules engine 120 attempt to deliver package B to subscriber 1, and so on.

Throughout the delivery process, the dependency-aware rules engine 120 also applies the upgrade rules 128 that has been specified by the operating entity 114 indicating when the dependency-aware rules engine 120 is allowed to begin delivery to specific subsets of subscribers 102 and applying any exclusion that the operating entity 114 has specified. This process continues until the whole delivery is done, no matter how large. Throughout the process, the dependency-aware rules engine 120 may make available through API 124 aggregate statistics about the current status of the delivery operations to the operating entity 114. All the statistics remain in a database indefinitely to allow the operating entity 114 to perform analytics on past delivery operations. Through API 124 or a web interface, the operating entity 114 is able to retrieve and view the status of past and present delivery operations as well as a schedule of future delivery operations.

The dependency-aware approach of the push upgrade system 116 and the dependency-aware rules engine 120 is a significant advancement over prior techniques. That is, the construction of a per-subscriber dependency graph and executing the package upgrades in order of the per-subscriber dependency graph, in addition to scheduling rules and exclusion rules represent functionality that conventional push upgrade systems fail to perform.

Figure 3:
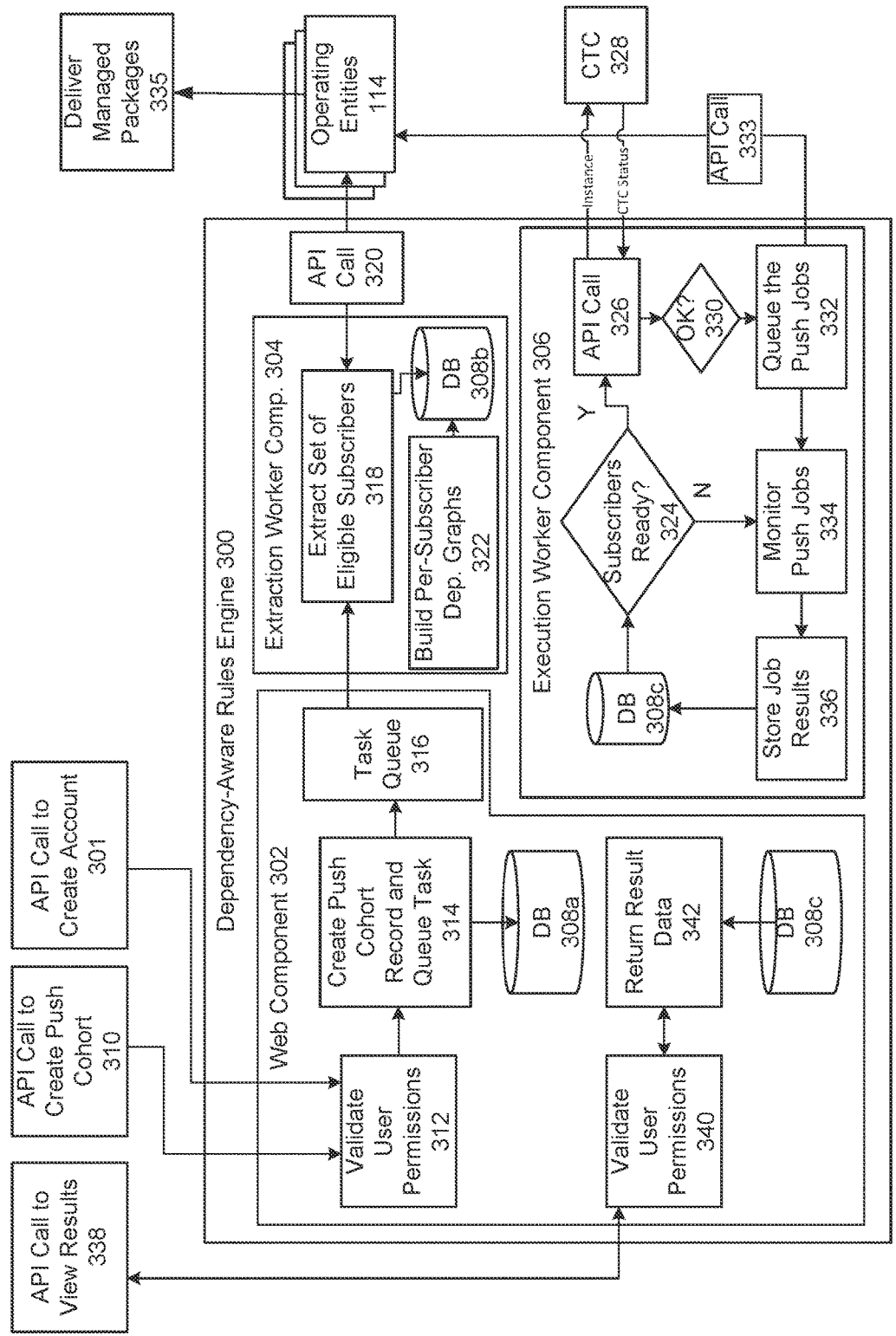
FIG. 3 illustrates a block diagram showing components and processing flow of the dependency-aware rules engine in further detail.

FIG. 3 illustrates a block diagram showing components and processing flow of the dependency-aware rules engine 120 in further detail. In one example implementation, the dependency-aware rules engine 300 is executed by the server system 118 to perform dependency-aware push upgrades, and its functionality may be separated into different execution environments or components component. For example, in the implementation shown, the dependency-aware rules engine 300 may include a web component 302, an extraction worker component 304, and an execution worker component 306. However, the functionality may be implemented with a lesser or greater number of execution environments. The dependency-aware rules engine 300 may further include at least one database 308 that stores user permissions, subscriber information, the per-subscriber dependency graphs, and delivery operation status for past, present and scheduled push delivery operations. In FIG. 3, three separated databases 308a, 308b, 308c are depicted and are collectively referred to as database 308.

The push upgrade process begins with the web component 302 receiving an initial API call from an operator of an operating entity 114 during a configuration phase to create an account and/or to preconfigure a set of user permissions (block 301). The set of user permissions are stored in the database 308 and define which operators/users are allowed to perform which actions on the dependency-aware rules engine 300. The operators/users can be human or other systems.

In one implementation, the user permissions may define a permission structure comprising users, access groups, and access group members. These are set up during configuration and define which users can create a push cohort, view delivery operation results, and view individual subscribers. For example, the user permissions can establish a separation of concerns where the permissions may specify that user G can generally run upgrades and user F can view the results of those upgrades but cannot start one, and vice versa.

In some implementations, the dependency-aware rules engine 300 may also receive in the initial API call 301, or another API call, managed package permissions that may specify individual packages that are allowed to be represented in a dependency graph or the individual packages that are not allowed to be represented in a dependency graph.

Additionally or alternatively, the operator also defines in the initial API call 301 or another API call a set of push schedule rules and subscriber exclusion rules that control when and to whom the dependency-aware rules engine 300 may push upgrades. The push schedule rules may define the times after which dependency-aware rules engine 300 can begin delivering to each segment of the subscriber base. In one implementation, the subscriber exclusion rules can be associated with packages and may specify that a particular package may not be pushed to a specific subscriber by ID, or may specify that the particular package may not be pushed to any subscriber that does not already have a specific minimum version of the software (e.g., if they do not have version 1.2, do not push 1.3). The operator may also define the API call or another API call a desired chunking size on a per-instance basis.

During operation, the dependency-aware rules engine 300 receives a first API call from the operating entity 114 to create a push cohort (block 310). In one implementation, the first API call 310 may include an identifier (ID) of the operator and a link to a package dependency graph 122. The package dependency graph 122 is a representation of the cohort, which is a group of managed software packages 112 being operated on together including the group's internal structure and dependency relationships.

In one implementation, the first API call 310 may be handled by the web component 302. The web component 302 may first validate user permissions against the preconfigured user permissions stored in the database 308 (block 312). The web component 302 may validate user permissions by searching the database 308 for the operator ID from the first API call 310 to retrieve the corresponding predefined user permissions, and then determine whether the operator/user has the rights to run update operations on all the constituents packages defined by the package dependency graph 122.

Once the user is validated, a push cohort record is created and queued as a task (block 314). The push cohort record may include cohort details, such as the package dependency graph 122 and the push cohort record is saved in the database 308. The task corresponding to the push cohort record added to a task queue 316 for the extraction worker component 304. The task queue 316 may be implemented as in-memory data structure store used as a database, cache, and message broker. An example of such a data structure is Redis™. The queued task includes a link to the package dependency graph 122 and operates as a notice for the extraction worker component 304 to process the package dependency graph 122.

The extraction worker component 304 retrieves the task from the task queue 316 to obtain the cohort details and to perform an extract operation that extracts the set of eligible push subscribers for all the managed software packages 112 specified in the package dependency graph 122 (block 318). To do so, the extraction worker component 304 makes an API call 320 that runs a query against the operating entities 114 for each of the managed software packages 112 to determine the eligible push subscribers for the corresponding package. The extraction worker component 304 then combines the results to determine a total set of eligible subscribers.

The extraction worker component 304 also builds a dependency graph for each subscriber in the total set of eligible subscribers, resulting in a set of per-subscriber dependency graphs 322. A listing of the managed software packages 112, the set of eligible push subscribers, and the per-subscriber dependency graphs 126 are saved in the database 308 for access by the execution worker component 306. At the conclusion of the work performed by the extraction worker, the state of the application is that the database contains all the per subscriber relationships to deliver the dependency graph of packages to the subscribers. When the extraction worker component 304 completes processing a particular task, new data is stored in the database 308 representing subscribers that are ready to receive push upgrades.

In one implementation, the execution worker component 306 executes in a continuous engine loop. The execution worker component 306 monitors whether there is a new set of eligible subscribers in the database 308 representing a push operation that is ready to be performed (block 324). If so, the execution worker component 306 begins the push operation by extracting the set of eligible subscribers and the per-subscriber dependency graphs from the database 308. Note, note that the various rules configured by the operator, e.g., push schedule rules, subscriber exclusion rules, and chunking rules, are applied by the extraction worker component 304 and the execution worker component 306 throughout their execution.

When the set of eligible subscribers is identified as being ready, the execution worker component 306 makes an API call (block 326) to a change traffic control (CTC) system 328 of the cloud platform 108 with an ID of the subscriber instances to request a status of whether subscriber changes can be performed at the present time. CTC 328 may refer to a system used by the cloud platform 108 to impose change moratoria in situations where some overruling external event prohibits changes either to the subscribers or to internal infrastructure. The API call 326 returns a CTC status, which is typically an approval or a denial. When it is determined the CTC status indicates the operation is cleared to proceed (block 330), then the execution worker component 306 queues push jobs for each of the subscribers and the set of eligible subscribers (block 332).

Given the set of eligible subscribers is ready to receive the push upgrades, the operation to queue the push jobs 332 involves another API call 333 to the operating entities 114 of the cloud platform 108 to instruct the operating entities 114 to begin the delivery of the managed software packages 112 to this set of eligible subscribers. The operating entities 114 then begins delivery of the managed software packages 112 to the eligible subscribers based on the order defined in the per-subscriber dependency graphs. In one implementation, each API call specifies a package and the subscriber. In another implementation, one API call may specify more than one package. The API calls 333 returns IDs of the push operations requested from the operating entities 114, and the push operation IDs are stored in the database 308.

At this point, the execution worker component 306 has received some arbitrary number of push operations requested of the operating entities 114. The execution worker component 306 monitors the push jobs 334 (block 334) by sending additional API calls to the operating entities 114 with the corresponding push operation IDs to determine the status of the push operations. Once the status of a given push operation ID is received, the status (e.g., pending, success, fail, etc.) is stored in the database in the record for that for that ID.

Returning to the example of packages A and B being delivered to subscriber 1, if the execution worker component 306 receives data from the operating entity 114 that delivery of package A to subscriber 1 has succeeded, persistence of that status in the database 308 is an indication to the execution worker component 306 that delivery of package B to subscriber 1 is now ready because package B's dependencies have been satisfied. The push operation to deliver package B to subscriber 1 will be picked up on the next iteration through the subscribers ready decision block 324 and the loop continues. As push jobs are completed, the job results are stored in the database 308 (block 336). This process continues until all the push operations run to a completed state, either success or failure. The monitoring of the push jobs 334 effectively retrieves status information from the operating entities 114 about the progress of current push upgrade jobs and, allowing new subscriber delivery operations to begin continuously as their individual dependencies are fulfilled.

The dependency-aware rules engine achieves high performance by applying its per-subscriber dependency graph to maximize parallelism in the delivery process, allowing dependent packages to begin delivery, while packages higher in the dependency graph are still running.

The multiple-subscriber diagrams shown in FIGS. 2B, 2C and 2D illustrate the parallelism performed by the dependency-aware rules engine 300 using the per-subscriber dependency graphs 226. For example, for subscriber 4, packages A and D that have no dependency relationships may be delivered in parallel, saving time. For subscribers 1-3, delivery of package B may begin for each subscriber as soon as package A has completed for that subscriber, meaning that the overall process of delivering package A across all in-scope subscribers runs in parallel with the same process for package B. The latter feature ameliorates the need to wait for the entire delivery process of package A to complete before beginning delivery of package B, yielding performance improvements.

In a further implementation, the push job status and results are made available for reviewing by a user via further API calls. That is, web component 302 may receive an API call from a user/operator to view the results of a push cohort (block 338). In one implementation, the user may be part of one of the operating entities 114, but doesn't necessarily have to be the same user who made the initial API call to create the push cohort. The API call includes a user ID and one or more push operation IDs. The web component 302 uses the user ID to validate the user permissions to determine the users access rights to the data (block 340). The web component 302 makes a call to database 308 with the push operation IDs, receives the result data for each push operation, aggregates the results and displays the aggregated results in a web-based dashboard.

A dependency-aware rules engine for delivering managed package upgrades has been disclosed. The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
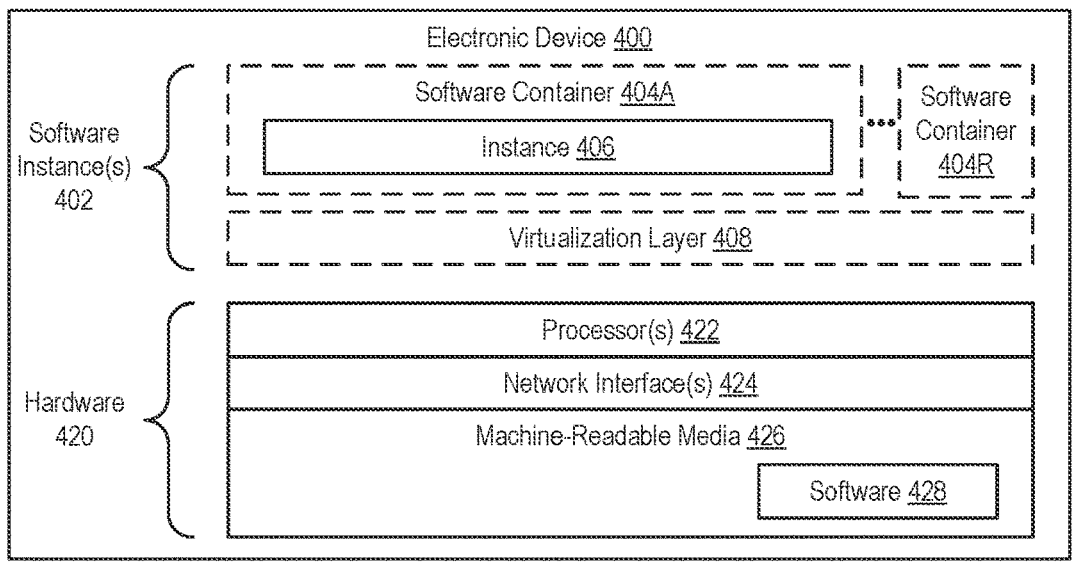
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include nontransitory and/or transitory machine-readable media. Each of the previously described clients and the dependency-aware rules engine for delivering managed package upgrades may be implemented in one or more electronic devices 400. In one implementation: 1) each of the clients is implemented in a separate one of the electronic devices 400 (e.g., in end user devices where the software 428 represents the software to implement clients to interface directly and/or indirectly with the dependency-aware rules engine for delivering managed package upgrades (e.g., software 428 represents a web browser, a native client, a portal, a command-line interface, and/or an application programming interface (API) based upon protocols such as Simple Object Access Protocol (SOAP), Representational State Transfer (REST), etc.)); 2) the dependency-aware rules engine for delivering managed package upgrades is implemented in a separate set of one or more of the electronic devices 400 (e.g., a set of one or more server devices where the software 428 represents the software to implement the dependency-aware rules engine for delivering managed package upgrades); and 3) in operation, the electronic devices implementing the clients and the dependency-aware rules engine for delivering managed package upgrades would be communicatively coupled (e.g., by a network) and would establish between them (or through one or more other layers and/or or other services) connections for submitting configuration data to the dependency-aware rules engine for delivering managed package upgrades and returning a software package to the clients. Other configurations of electronic devices may be used in other implementations (e.g., an implementation in which the client and the dependency-aware rules engine for delivering managed package upgrades are implemented on a single one of electronic device 400).

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Example Environment

Figure 4B:
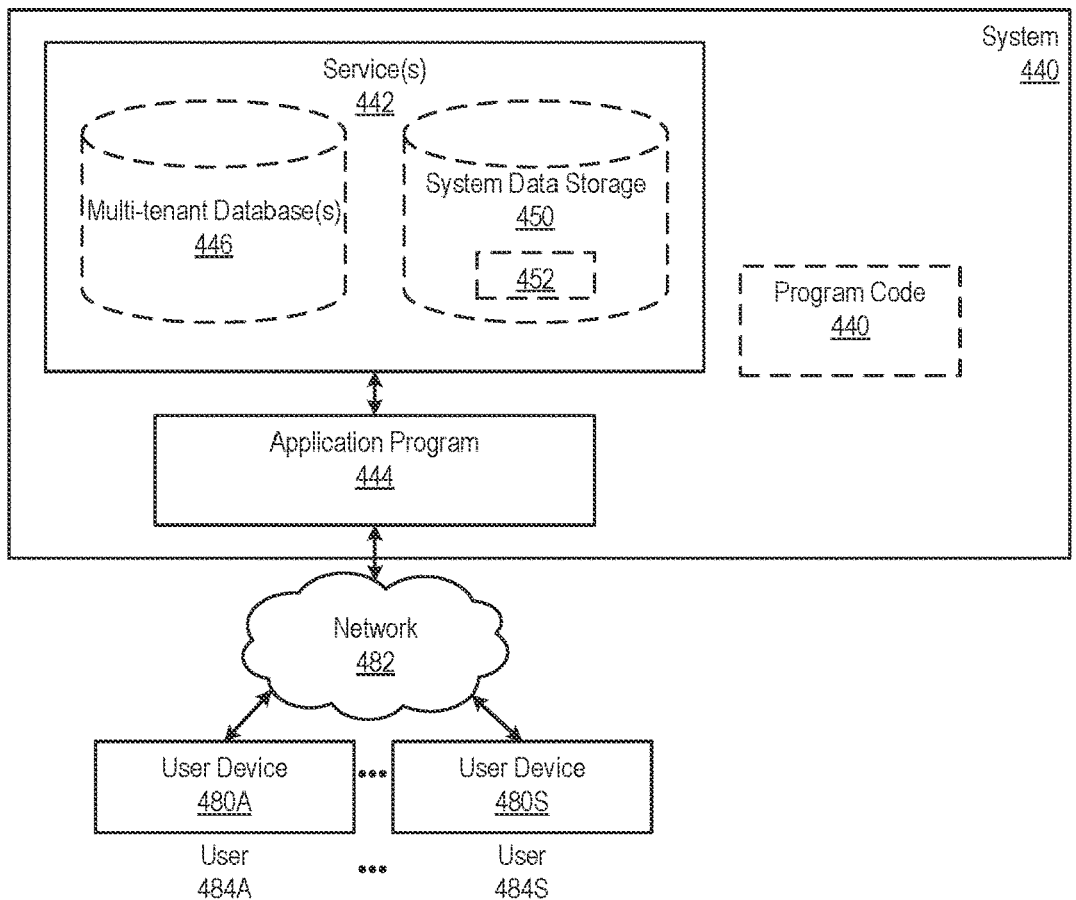
FIG. 4B is a block diagram of a deployment environment according to some example implementations.

FIG. 4B is a block diagram of a deployment environment according to some example implementations. A system 440 includes hardware (e.g., a set of one or more server devices) and software to provide service(s) 442, including the dependency-aware rules engine for delivering managed package upgrades. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform (GCP)), Microsoft Corporation (Azure)).

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multitenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multitenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following types of services: Push upgrade system; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more of user devices 480A-480S.

In some implementations, one or more of the service(s) 442 may use one or more multitenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the dependency-aware rules engine for delivering managed package upgrades, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-480S.

Each user device 480A-480S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-484S to interact with various GUI pages that may be presented to the one or more of users 484A-484S. User devices 480A-480S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-480S might include an HTTP client, commonly referred to as a "browser," for sending and receiving HTTP messages to and from server(s) of system 440, thus allowing users 484A-484S of the user devices 480A-480S to access, process and view information, pages and applications available to it from system 440 over network 482.

Conclusion

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method implemented by a server system for pushing managed package upgrades, comprising:
receiving, over a network, a package dependency graph from a first operating entity via a first API call that expresses relationships between a set of managed software packages;
ingesting a subscriber set subscribed to the set of managed software packages via a second API call to a second operating entity that owns the managed software packages;
constructing a per-subscriber dependency graph expressing relationships between the individual subscriber's delivery operations; and
executing delivery of the set of managed software packages based on dependency order of the per-subscriber dependency graph, while applying rules including one or more of:
push schedule rules that allow the first operating entity to specify time-based gates before which delivery is not to be attempted; and
subscriber exclusion rules that allow the first operating entity to exclude specific subscribers and those subscribers who have old software product versions.

2. The method of claim 1, wherein receiving, over the network, the package dependency graph from a first operating entity via the first API call further comprises: determining a hierarchical dependency order of delivery operations between the set of managed software packages from the package dependency graph.

3. The method of claim 2, further comprising: receiving in the first API call an identifier (ID) of an operator of the first operating entity and a link to the package dependency graph.

4. The method of claim 1, wherein executing delivery of the set of managed software packages further comprises installing the set of managed software packages in instances of the individual subscribers in a cloud platform.

5. The method of claim 1, further comprising: making available through an API or a web interface statistics about a status of past and present delivery operations as well as a schedule of future delivery operations.

6. The method of claim 1, further comprising: receiving an initial API call from an operator of the first operating entity to create an account and to preconfigure a set of user permissions, the preconfigured set of user permissions defining which operators are allowed to perform which actions on a dependency-aware rules engine implementing the method.

7. The method of claim 6, further comprising: defining by the preconfigured set of user permissions which users can create a push cohort, view delivery operation results, and view individual subscribers.

8. The method of claim 6, further comprising: receiving in the initial API call managed package permissions specifying individual packages that are allowed to be represented in the dependency graph or the individual packages that are not allowed to be represented in the dependency graph.

9. The method of claim 6, wherein receiving the first API call further comprises: validating user permissions against the preconfigured set of user permissions stored in a database.

10. The method of claim 1, wherein executing delivery of the set of managed software packages further comprises: sending requests to the first operating entity to deliver the managed software packages to the subscribers.

11. The method of claim 1, further comprising implementing the method for pushing managed package upgrades in a push upgrade system comprising the server system that executes a dependency-aware rules engine that automatically manages and deploys the managed software packages and their upgrades to one or more cloud platforms.

12. A non-transitory machine-readable storage medium that provides instructions that, if executed by a processor, are configurable to cause said processor to perform operations comprising:
receiving, over a network, a package dependency graph from a first operating entity via a first API call that expresses relationships between a set of managed software packages;
ingesting a subscriber set subscribed to the set of managed software packages via a second API call to a second operating entity that owns the managed software packages;
constructing a per-subscriber dependency graph expressing relationships between the individual subscriber's delivery operations;
executing delivery of the set of managed software packages based on dependency order of the per-subscriber dependency graph, while applying rules including one or more of:
push schedule rules that allow the first operating entity to specify time-based gates before which delivery is not to be attempted; and
subscriber exclusion rules that allow the first operating entity to exclude specific subscribers and those subscribers who have old software product versions.

13. The non-transitory machine-readable storage medium of claim 12, wherein instructions for receiving, over the network, the package dependency graph from a first operating entity via the first API call further comprise: determining a hierarchical dependency order of delivery operations between the set of managed software packages from the package dependency graph.

14. The non-transitory machine-readable storage medium of claim 13, further comprising: receiving in the first API call an identifier (ID) of an operator of the first operating entity and a link to the package dependency graph.

15. The non-transitory machine-readable storage medium of claim 12, wherein executing delivery of the set of managed software packages further comprises installing the set of managed software packages in instances of the individual subscribers in a cloud platform.

16. The non-transitory machine-readable storage medium of claim 12, further comprising: making available through an API or a web interface statistics about a status of past and present delivery operations as well as a schedule of future delivery operations.

17. The non-transitory machine-readable storage medium of claim 12, further comprising: receiving an initial API call from an operator of the first operating entity to create an account and to preconfigure a set of user permissions, the preconfigured set of user permissions defining which operators are allowed to perform which actions on a dependency-aware rules engine implementing the instructions.

18. The non-transitory machine-readable storage medium of claim 17, further comprising: defining by the preconfigured set of user permissions which users can create a push cohort, view delivery operation results, and view individual subscribers.

19. The non-transitory machine-readable storage medium of claim 17, further comprising: receiving in the initial API call managed package permissions specifying individual packages that are allowed to be represented in the dependency graph or the individual packages that are not allowed to be represented in the dependency graph.

20. The non-transitory machine-readable storage medium of claim 17, wherein receiving the first API call further comprises: validating user permissions against the preconfigured set of user permissions stored in a database.

21. The non-transitory machine-readable storage medium of claim 12, wherein executing delivery of the set of managed software packages further comprises: sending requests to the first operating entity to deliver the managed software packages to the subscribers.

22. The non-transitory machine-readable storage medium of claim 12, further comprising implementing the instructions for pushing managed package upgrades in a push upgrade system comprising a server system that executes a dependency-aware rules engine that automatically manages and deploys the managed software packages and their upgrades to one or more cloud platforms.

23. An apparatus comprising:
a processor;
a non-transitory machine-readable storage medium that provides instructions that, if executed by the processor, are configurable to cause the apparatus to perform operations comprising,
receiving, over a network, a package dependency graph from a first operating entity via a first API call that expresses relationships between a set of managed software packages;
ingesting a subscriber set subscribed to the set of managed software packages via a second API call to a second operating entity that owns the managed software packages;
constructing a per-subscriber dependency graph expressing relationships between the individual subscriber's delivery operations;
executing delivery of the set of managed software packages based on dependency order of the per-subscriber dependency graph, while applying rules including one or more of:
    push schedule rules that allow the first operating entity to specify time-based gates before which delivery is not to be attempted; and
    subscriber exclusion rules that allow the first operating entity to exclude specific subscribers and those subscribers who have old software product versions.

* * * * *